(12) United States Patent
Yahazu et al.

(10) Patent No.: US 7,256,382 B2
(45) Date of Patent: Aug. 14, 2007

(54) SOLID STATE IMAGING DEVICE, METHOD OF DRIVING SOLID STATE IMAGING DEVICE AND IMAGE PICKUP APPARATUS

(75) Inventors: Koji Yahazu, Kanagawa (JP); Kazuhide Yokota, Kanagawa (JP); Ken Koseki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/380,023

(22) Filed: Apr. 25, 2006

(65) Prior Publication Data
US 2006/0243883 A1    Nov. 2, 2006

(30) Foreign Application Priority Data
Apr. 26, 2005   (JP) .......................... P2005-127631

(51) Int. Cl.
*H01L 27/00* (2006.01)
*H03F 3/08* (2006.01)

(52) U.S. Cl. .............................. 250/208.1; 250/214 R; 348/308

(58) Field of Classification Search ............. 250/208.1, 250/214 R, 214 A; 348/294, 300–303, 308, 348/320
See application file for complete search history.

(56) References Cited

U.S. PATENT DOCUMENTS

| | | | |
|---|---|---|---|
| 7,183,531 B2* | 2/2007 | Olsen et al. ............. | 250/208.1 |
| 2005/0259167 A1* | 11/2005 | Inoue et al. ................ | 348/300 |

* cited by examiner

*Primary Examiner*—Kevin Pyo
(74) *Attorney, Agent, or Firm*—Sonnenschein Nath & Rosenthal LLP

(57) ABSTRACT

When an addition/averaging process is done for pixels in the same color in a unit pixel block in a stage reading pixel information to a horizontal signal line, the addition/averaging process is also done for a noise component added in a signal process from the pixels to the horizontal signal line. Thus, a problem arises in the signal-to-noise ratio. Each of signal processing circuits of a column signal processing circuit part is provided with reverse amplifiers which output signals of pixels transmitted by a vertical signal line at a low impedance, and with feedback capacitances which are adjustably connected in parallel to these reverse amplifiers, the signal processing circuit being disposed at every column. These feedback capacitances are used to do row wise and column wise pixel addition for the pixels in the same color in the unit pixel block to take out pixel signals for a single pixel in simulation.

4 Claims, 11 Drawing Sheets

FIG. 3

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | G | B | G | B | G | B | G | B | G | B | G | B | G | B | G |
| 2 | R | G | R | G | R | G | R | G | R | G | R | G | R | G | R |
| 3 | G | B | G | B | G | B | G | B | G | B | G | B | G | B | G |
| 4 | R | G | R | G | R | G | R | G | R | G | R | G | R | G | R |
| 5 | G | B | G | B | G | B | G | B | G | B | G | B | G | B | G |
| 6 | R | G | R | G | R | G | R | G | R | G | R | G | R | G | R |
| 7 | G | B | G | B | G | B | G | B | G | B | G | B | G | B | G |
| 8 | R | G | R | G | R | G | R | G | R | G | R | G | R | G | R |
| 9 | G | B | G | B | G | B | G | B | G | B | G | B | G | B | G |
| 10 | R | G | R | G | R | G | R | G | R | G | R | G | R | G | R |
| 11 | G | B | G | B | G | B | G | B | G | B | G | B | G | B | G |

FIG. 4

|   | 1 | 2 | 3 | 4 | 5 | 6 | 7 |
|---|---|---|---|---|---|---|---|
| 1 | G | B | G | B | G | B | G |
| 2 | R | G | R | G | R | G | R |
| 3 | G | B | G | B | G | B | G |
| 4 | R | G | R | G | R | G | R |
| 5 | G | B | G | B | G | B | G |

SOLID STATE IMAGING DEVICE, METHOD OF DRIVING SOLID STATE IMAGING DEVICE AND IMAGE PICKUP APPARATUS

CROSS REFERENCE TO RELATED APPLICATIONS

The present invention contains the subject matter related to Japanese patent Application JP 2005-127631 filed in the Japanese Patent Office on Apr. 26, 2005, the entire contents of which being incorporated herein by reference.

BACKGROUND OF THE INVENTION

1. Field of the Invention

The present invention relates to a solid state imaging device, a method of driving a solid state imaging device and an image pickup apparatus.

2. Description of the Related Art

A solid state imaging device is broadly divided into a charge transfer solid state imaging device typified by a CCD (Charge Coupled Device) image sensor, and an X-Y addressing solid state imaging device typified by a MOS (Metal Oxide Semiconductor) image sensor. In recent years, the latter solid state imaging device, for example the MOS image sensor is mounted particularly for use in a low power consumption camera module for mobile appliances such as a cellular mobile phone and a high speed electronic still camera.

For example, in an electronic still camera which is demanded for high resolution, since a still picture taken by clicking a shutter is demanded for high definition, a solid state imaging device having a larger number of pixels is to be used. However, in the electronic still camera, moving images are shown on an electronic viewfinder and a small screen monitor to allow confirming a subject. Therefore, in the stage to confirm the subject, picture signals of relatively low resolution should be read out at high speed.

In the past, in order to read the picture signals of relatively low resolution at high speed, a pixel is formed to have a color filter having a predetermined color coding, a unit is made of a pixel block formed of a plurality of pixels adjacent to each other in the row wise direction (the direction along rows) and the column wise direction (the direction along columns), and information about pixels having a filter in the same color in the unit pixel block is added/averaged to read it as pixel information for a single pixel in simulation (for example, see Patent Reference 1: JP-A-2004-266369).

SUMMARY OF THE INVENTION

However, in the related art above, the addition/averaging process for information about pixels having a filter in the same color in the unit pixel block is done in the stage in which pixel information is read out to a horizontal signal line, and thus noise components that can be added in a signal process system from pixels to the horizontal signal line also experience addition/averaging, which causes difficulties on the signal-to-noise ratio.

It is desirable to provide a solid state imaging device which can obtain a pixel addition signal excellent in the signal-to-noise ratio, a method of driving the solid state imaging device, and an image pickup apparatus which uses the solid state imaging device for an imaging device.

According to an embodiment of the invention, the invention adapts a configuration of a solid state imaging device including: a pixel array part which has a plurality of pixels which are arranged two-dimensionally and each of which includes a photoelectric conversion element, a plurality of vertical signal lines which transmit a signal from each of the plurality of pixels and a color filter which has a predetermined color coding at the plurality of pixels;

a column signal processing circuit part which has a plurality of analog amplifiers which receive the signal from each of the plurality of pixels transmitted through the plurality of vertical signal lines and a plurality of feedback capacitances which are adjustably connected in parallel to the plurality of analog amplifiers;

a first control part which performs control in which a certain number of pixels in the same color in row wise and column wise directions is a unit pixel block, and in reading signals of the pixels in the same color in a single row in the unit pixel block, the signals of the pixels in the same color are stored in a first feedback capacitance of a single column in the column signal processing circuit part;

a second control part which performs control in which in reading signals of the pixels in the same color at a row different from the single row in the unit pixel block, the signals stored in the first feedback capacitance are pre-charged in a second feedback capacitance at a column different from the single column in the column signal processing circuit part; and a third control part which performs control in which the signals of the pixels in the same color at the different row are stored in the second feedback capacitance after pre-charged.

In the solid state imaging device having the configuration above, suppose a color arrangement is formed to do color coding of the color filter such that pixels in the same color are repeated at every two pixels in the row wise direction (the direction along rows, or the horizontal direction) and pixels in the same color are repeated at every two pixels in the column wise direction (the direction along columns, or the vertical direction). In reading signals of the pixels in the same color in a single row in the unit pixel block (in this embodiment, pixels of three row wise pixels times three column wise pixels), the signals of the pixels in the same color are stored in the first feedback capacitance at a single column in the unit pixel block in the column signal processing circuit part. Thus, the signals of two row wise pixels in the same color are first added and stored in the first feedback capacitance.

Subsequently, in reading signals of the pixels in the same color at a row different from that single row in the unit pixel block, the signals stored in the first feedback capacitance are pre-charged in a second feedback capacitance at a column different from the single column in the column signal processing circuit part. Thus, signals added with the signals of two row wise pixels at the first row are stored in the second feedback capacitance. Then, the signals of the pixels in the same color at the different row are stored in the second feedback capacitance, and thus the signals of two row wise pixels in the same color at the different row are added and stored. Consequently, in the second feedback capacitance, the pixel addition of row wise and column wise pixels in the same color in the unit pixel block, in this embodiment, the pixel addition of pixels of two row wise pixels times two column wise pixels is finally performed.

As described above, in the column signal processing circuit part having an analog amplifier, the signals resulted from pixel addition by using the feedback capacitance of that analog amplifier are in turn selected by the horizontal selection switch group and outputted through the horizontal signal line. However, the description here is the case of the basic operation that takes an example of pixel addition of pixels of two row wise pixels times two column wise pixels. Also in the case of pixel addition such as pixels of three row wise pixels times three column wise pixels, four row wise pixels times four column wise pixels, and so on, the basic operation is repeatedly run.

According to an embodiment of the invention, in the column signal processing circuit part having the analog amplifier, the feedback capacitance of the analog amplifier is used to do pixel addition, and thus the signals of the pixels can be amplified while the addition process can be done. Therefore, a pixel addition signal excellent in the signal-to-noise ratio can be obtained.

BRIEF DESCRIPTION OF THE DRAWINGS

The teachings of the invention can be readily understood by considering the following detailed description in conjunction with the accompanying drawings, in which:

FIG. 3 is a diagram illustrating an exemplary color coding of a color filter;

FIG. 4 is a diagram illustrating an exemplary addition result of pixel addition;

DETAILED DESCRIPTION OF THE INVENTION

Hereinafter, an embodiment according to the invention will be described in detail with reference to the drawings.

Figure 1:
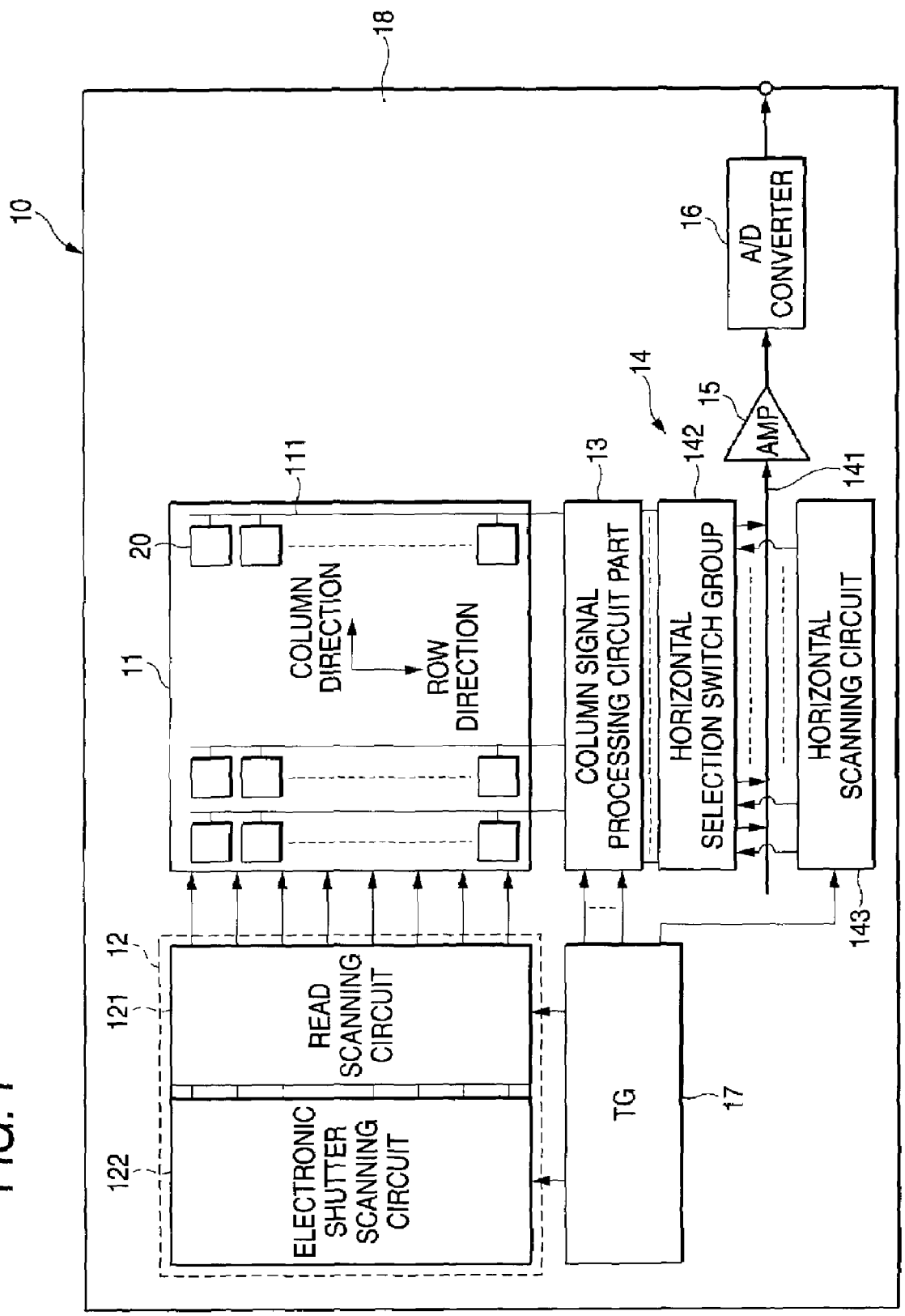
FIG. 1 is a block diagram illustrating the overall configuration of an X-Y addressing solid state imaging device according to an embodiment of the invention.

FIG. 1 is a block diagram illustrating the overall configuration of a solid state imaging device according to an embodiment of the invention, for example, an X-Y addressing solid state imaging device typified by a CMOS image sensor. As shown in FIG. 1, a solid state imaging device 10 of the embodiment has a pixel array part 11 as well as peripheral circuits including a vertical drive part 12, a column signal processing circuit part (column signal processing circuit part) 13, a horizontal drive part 14, an analog amplifier 15, an A/D converter 16, and a timing generator 17, and the device has the configuration in which these peripheral circuits are formed on a semiconductor substrate (chip) 18 as the pixel array part 11 is.

However, it is not limited to the configuration in which all the peripheral circuits are necessarily formed on the semiconductor substrate 18. A configuration may be adapted in which the A/D converter 16, for example, is placed outside the semiconductor substrate 18.

The pixel array part 11 is configured in which a pixel 20 including a photoelectric conversion element is arranged two-dimensionally in a matrix (in a matrix form) and a color filter having a predetermined color coding for every pixel is formed. In the pixel array part 11, a vertical signal line 111 is wired to each of the pixels 20 in a matrix layout in units of columns, and drive lines such as a reset line 112, a transfer line 113 and a selection line 114, described later, are wired in units of rows.

Pixel Circuit

Figure 2:
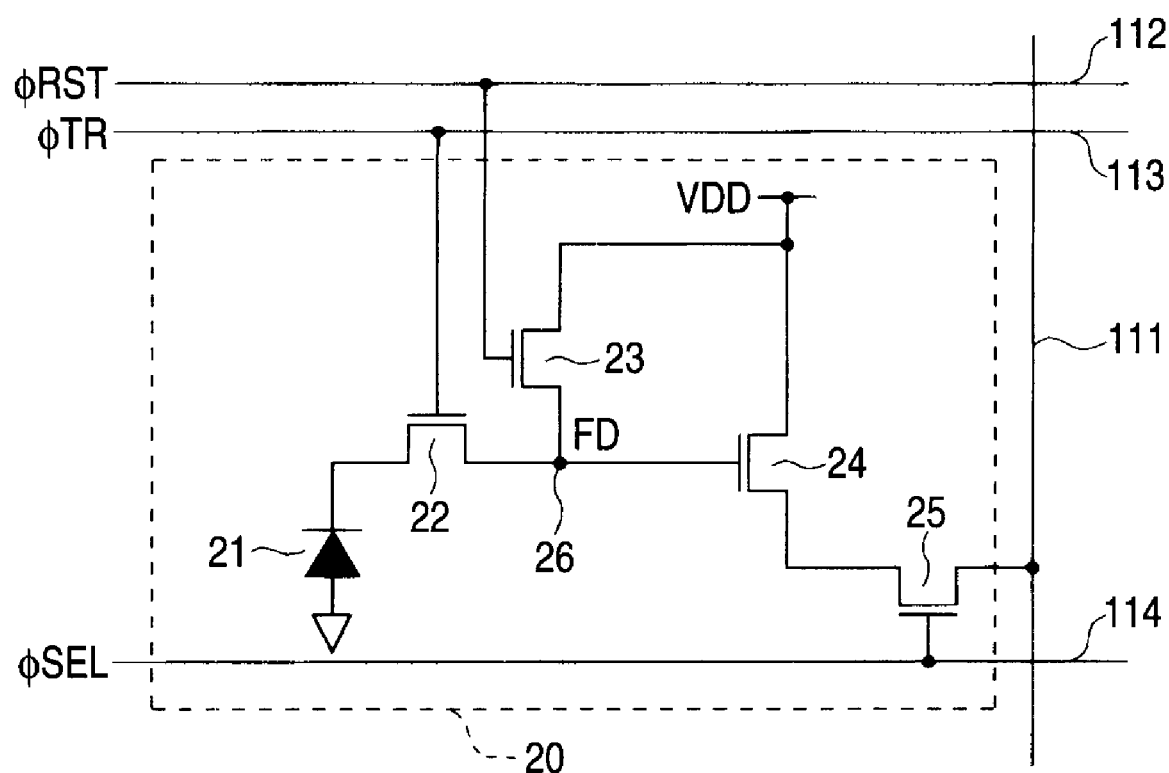
FIG. 2 is a circuit diagram illustrating an exemplary circuit configuration of a pixel.

FIG. 2 is a circuit diagram illustrating an exemplary circuit configuration of the pixel 20. As shown in FIG. 2, the pixel 20 of this exemplary circuit has a pixel circuit formed of a photoelectric conversion element, for example, a photodiode 21, and four transistors such as a transfer transistor 22, a reset transistor 23, an amplifier transistor 24 and a selection transistor 25. Here, for these transistors 22 to 25, an N channel MOS transistor, for example, is used.

The transfer transistor 22 is connected between a cathode of the photodiode 21 and a floating diffusion part (hereinafter, denoted as an "FD part") 26, and its gate is connected to the transfer line 113. A transfer pulse φTR is applied to the gate through the transfer line 113 to turn to the ON state to transfer signal charge (here, electrons) that experiences photoelectric conversion and is stored at the photodiode 21, to the FD part 26.

The drain of the reset transistor 23 is connected to a power supply potential VDD, the source is connected to the FD part 26, and the gate is connected to the reset line 112. Prior to the signal charge transfer from the photodiode 21 to the FD part 26, a reset pulse φRST is applied to the gate through the reset line 112 to turn to the ON state to reset the potential of the FD part 26 to the power supply potential VDD.

For example, the drain of the selection transistor 25 is connected to the power supply potential VDD, the source is connected to the drain of the amplifier transistor 24, and the gate is connected to the selection line 114. A selection pulse φSEL is applied to the gate through the selection line 114 to turn to the ON state to supply the power supply potential VDD to the amplifier transistor 24 for selecting the pixel 20. In addition, for the selection transistor 25, it may have a configuration in which it is connected between the source of the amplifier transistor 24 and the vertical signal line 111.

The amplifier transistor 24 has a source follower configuration in which the gate thereof is connected to the FD part 26, the drain is connected to the source of the selection transistor 25, and the source is connected to the vertical signal line 111. It outputs the potential at the FD part 26 after being reset by the reset transistor 23 as the reset level to the vertical signal line 111, and outputs the potential at the FD part 26 after the transfer transistor 22 has transferred signal charge as the signal level to the vertical signal line 111.

In addition, here, the circuit configuration having four transistors 26 to 29 is taken as an example and explained as the circuit configuration of the pixel 20, but it is not defined to the four transistor configuration, which may be a three transistor configuration in which the amplifier transistor 24 also serves as the selection transistor.

Peripheral Circuit

Now return to FIG. 1. The vertical drive part 12 has a read scanning circuit 121 and an electronic shutter scanning circuit 122, having the configuration in which the scanning circuits 121 and 122 are placed side by side. It selectively drives the pixel 20 in turn in units of rows through the reset line 112, the transfer line 113 and the selection line 114 shown in FIG. 2.

The read scanning circuit 121 is configured to have a shift register and a drive circuit, which in turn selects the pixel 20 to read a signal in units of rows. The electronic shutter scanning circuit 122 basically has the same circuit configuration as that of the read scanning circuit 121, which implements electronic shutter operation in which it scans a row that experiences read scanning by the read scanning circuit 121 in such a way that it reads undesired charge from the photodiode 21 of the pixel 20 in that row, the readout scan is done earlier by the time for shutter speed than the read scanning by the read scanning circuit 121. Thus, the period between the canning timing for the electronic shutter scanning circuit 122 and the canning timing for the read scanning circuit 121 is an exposure period for the photodiode 21, that is, a charge period for signal charge.

The column signal processing circuit part 13 is configured to have column signal processing circuits by the number of the horizontal pixels, each of which is disposed at each of the vertical signal lines 111, which has the input end connected to the output end of each of the vertical signal lines 111. Each of the signal processing circuits of the column signal processing circuit part 13 is configured to have a CDS (Correlated Double Sampling) circuit in which it takes the difference between the signal level and the reset level (0 level) in turn read out of the pixel 20 to the vertical signal line 111, described above, and sets the difference to the pixel signal level to remove fixed pattern noise at every pixel.

In the embodiment of the invention, it has a feature in that the column signal processing circuit part 13 performs pixel addition, described later. The detail of the specific configuration and the circuit operation of each of the signal processing circuits of the column signal processing circuit part 13 will be described later.

The horizontal drive part 14 is configured to have a horizontal signal line 141, a horizontal selection switch group 142 which is connected between the output end of each of the signal processing circuits of the column signal processing circuit part 13 and the horizontal signal line 141, and a horizontal scanning circuit 143 which selectively scans each of switches of the horizontal selection switch group 142.

In the horizontal drive part 14, the horizontal scanning circuit 143 is configured to have a shift register and a drive circuit, which in turn selects each of the switches of the horizontal selection switch group 142. Each of the switches of the horizontal selection switch group 142 is selectively driven by the horizontal scanning circuit 143, and in turn outputs signals of the pixel 20 outputted at each column from each of the signal processing circuits of the column signal processing circuit part 13 through the horizontal signal line 141.

The analog amplifier 15 amplifies and outputs analog signals supplied one by one through the horizontal signal line 141. The A/D converter 16 converts the analog signals outputted from the analog amplifier 15 to digital signals, and outputs them to the outside of the chip (substrate 18).

The timing generator (TG) 17 creates a clock pulse and a drive pulse for reference to the operation of the read scanning circuit 121, the electronic shutter scanning circuit 122, the column signal processing circuit part 13 and the horizontal scanning circuit 143 based on a vertical synchronization signal Vsync, a horizontal synchronization signal Hsync and a master clock MCK, and applies them to the read scanning circuit 121, the electronic shutter scanning circuit 122, the column signal processing circuit part 13 and the horizontal scanning circuit 143, etc.

Color Coding

FIG. 3 is a diagram illustrating an exemplary color coding of the color filter disposed at each of the pixels 20 in the pixel array part 11. Here, a Bayer array is exemplified in which a GB line has G (green) and B (blue) alternately arranged, an RG line has R (red) and G alternately arranged, and these are alternately arranged in the column wise direction. However, this Bayer array is simply an example, and the array is not limited thereto.

In the solid state imaging device 10 having the color filter in this color coding, in order to read a picture signal of relatively low resolution at high speed for the purpose of displaying a moving picture, the signals of the pixels in the same color are added to read a signal as pixel signals for a single pixel in simulation. In an embodiment of the invention, it has a feature in that this pixel addition is done at the column signal processing circuit part 13.

In the color coding shown in FIG. 3, suppose pixels of three row wise pixels times three column wise pixels, for example, are a unit pixel block, and an addition process is done for two pixels in the same color in the unit pixel block, that is, the addition process is done for pixels of two row wise pixels times two column wise pixels. As the result of the addition process, picture signals are obtained in which pixel information is thinned out by half both in the horizontal direction (row wise direction) and the vertical direction (column wise direction), as shown in FIG. 4.

Column Signal Processing Circuit Part

Next, the specific configuration and the circuit operation of each of the signal processing circuits in the column signal processing circuit part 13 will be described, which is the feature according to an embodiment of the invention. Here, in the color coding shown in FIG. 3, this case is taken as an example in which for example, pixels of three row wise pixels times three column wise pixels are a unit pixel block and an addition process is done for two pixels in the same color in that unit pixel block.

Circuit Configuration

Figure 5:
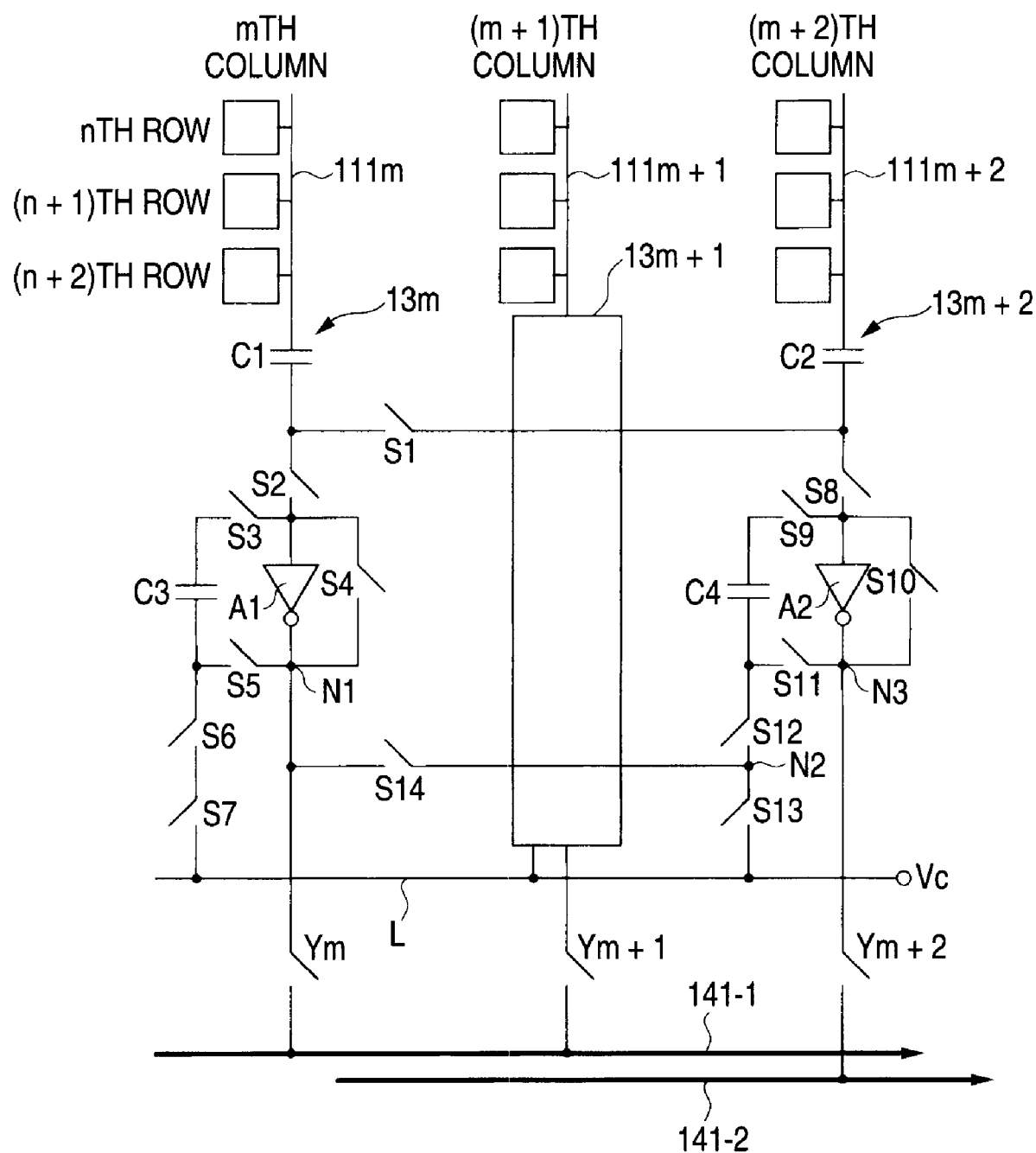
FIG. 5 is a circuit diagram illustrating an exemplary circuit configuration of each of signal processing circuits in a column signal processing circuit part.

FIG. 5 is a circuit diagram illustrating an exemplary circuit configuration of each of the signal processing circuits in the column signal processing circuit part 13. Here, for the sake of simplified illustration, only signal processing circuits for three columns corresponding to a certain unit pixel block (three row wise pixels times three column wise pixels) are shown in the column signal processing circuit part 13.

In addition, three rows in the unit pixel block are a row n, a row (n+1), and a row (n+2), and three columns are a column m, a column (m+1), and a column (m+2). In the row wise direction, since addition is done between the pixels in the column m and the column (m+2), only the circuit configurations of a column signal processing circuit 13m in the column m and a column signal processing circuit 13 (m+2) in the column (m+2) are specifically shown.

In the column signal processing circuit 13m, one end of a CDS capacitance C1 is connected to one end of a vertical signal line 111m in the mth column, and one end of a control switch S2 is connected to the other end of the CDS capacitance C1. To the other end of the control switch S2, the input end of an analog amplifier, such as a reverse amplifier A1 is connected. The reverse amplifier A1 outputs a signal of the pixel 20 transmitted by the vertical signal line 111m at low impedance.

To the other end of the control switch S2, one ends of control switches S3 and S4 are further connected. One end of the feedback capacitance C3 is connected to the other end of the control switch S3, and the other ends of control switches S5 and S6 are connected to the other end of the feedback capacitance C3. The other ends of the control switches S4 and S5 are connected to the output end of the reverse amplifier A1 in common. To the other end of the control switch S6, one end of a control switch S7 is connected. The other end of the control switch S7 is connected to a voltage line L to which reference voltage (reference voltage) Vc is applied.

The column signal processing circuit 13 (m+2) has the same circuit configuration as that of the column signal processing circuit 13m. More specifically, one end of a CDS capacitance C2 is connected to one end of a vertical signal line 111 (m+2) in the (m+2)th column, and one end of a control switch S8 is connected to the other end of the CDS capacitance C2. To the other end of the control switch S8, the input end of a reverse amplifier A2 is connected. The reverse amplifier A2 outputs a signal of the pixel 20 transmitted by the vertical signal line 111 (m+2) at low impedance.

To the other end of the control switch S8, one ends of control switches S9 and S10 are further connected. One end of a feedback capacitance C4 is connected to the other end of the control switch S9, and the other ends of control switches S11 and S12 are connected to the other end of the feedback capacitance C4. The other ends of the control switches S10 and S11 are connected to the output end of the reverse amplifier A2 in common. To the other end of the control switch S12, one end of a control switch S13 is connected. The other end of the control switch S13 is connected to a voltage line L.

In addition, two addition switches S1 and S14 are provided between the column signal processing circuit 13m and the column signal processing circuit 13 (m+2). The addition switch S1 is connected between the other ends of the CDS capacitances C1 and C2. The addition switch S14 is connected between a connecting node N1 at the output end of the reverse amplifier A1 and the other ends of the control switches S4 and S5 in the column signal processing circuit 13m and a connecting node N2 at the control switches S12 and S13 in the column signal processing circuit 13 (m+2).

In the column signal processing circuits 13m and (m+2) in the configuration above, the feedback capacitances C3 and C4 have a function as a sample hold capacitance that holds the signals of the pixels 20 transmitted from the vertical signal lines 111m and 111 (m+2), and they configure line memory that stores signals for a single row (a single line) along with feedback capacitances in the other columns.

The control switches S2 and S3 and the control switches S8 and S9 operate to selectively connect the CDS capacitances C1 and C2 and the feedback capacitances C3 and C4. The control switches S4 and S10 operate to feed back the reverse amplifiers A1 and A2 when the reset level is read out. The control switches S5 and S11 operate to selectively connect the feedback capacitances C3 and C4 to the reverse amplifiers A1 and A2. The control switches S6 and S7 and the control switches S12 and S13 operate to pre-charge the reference voltage Vc to the feedback capacitances C3 and C4 when the reset level is read out.

A horizontal selection switch Ym in the mth column is connected between the output end of the column signal processing circuit 13m, that is, the connecting node N1 and a first horizontal signal line 141-1, and a horizontal selection switch Y (m+2) in the (m+2)th column is connected between the output end of the column signal processing circuit 13 (m+2), that is, a connecting node N3 at the output end of the reverse amplifier A2 and the other ends of the control switches S10 and S11 and a second horizontal signal line 141-2.

In this regard, a horizontal selection switch Y (m+1) in the (m+1)th column is connected between the output end of a column signal processing circuit 13 (m+1) and the first horizontal signal line 141-1, and a horizontal selection switch Y (m+3) (not shown) in the (m+3)th column is connected between the output end of a column signal processing circuit 13 (m+3) (not shown), and the second horizontal signal line 141-2. After that, connection is similarly made to the first horizontal signal line 141-1 and the second horizontal signal line 141-2 in two units of columns.

Circuit Operation

Next, the circuit operation of each of the signal processing circuits in the column signal processing circuit part 13 of the configuration above will be described.

Circuit Operation when Normal Imaging

First, the circuit operation when normal imaging will be described in which no pixel addition is done, that is, when pixel information is not thinned out. When normal imaging, the vertical drive part 12 performs vertical scanning to in turn select each of the pixels of the pixel array part 11 in units of rows, and the signals of the pixels 20 in the selected row are read out to the vertical signal line 111.

The pixel signals read out to the vertical signal line 111 are inputted to the column signal processing circuit part 13, processed in a CDS process (a process that takes a difference between the reset level and the signal level) at the CDS capacitances C1, C2 and so on, amplified at the reverse amplifiers A1 and A2, and then stored in the line memory formed of the feedback capacitances C3, C4 and so on.

The switches of the horizontal selection switch group 142 (Y to Ym, Y (m+1), Y (m+2) and so on) are in turn selected by horizontal scanning at the horizontal scanning circuit 143, and in turn the pixel signals for a single line stored in the line memory are read out to the horizontal signal line 141. The pixel signals are amplified at the analog amplifier 15, digitally converted at the A/D converter 16, and outputted outside the chip.

A series of process steps are done for all the pixels 20 at every row, and thus picture signals for a single screen can be obtained. Accordingly, a single still picture of high definition can be created from the picture signals for a single screen.

Circuit Operation when Pixel Addition is Done

Next, the circuit operation when pixel information is thinned out by pixel addition will be described with reference to illustrations shown in FIGS. 6 and 7.

Here, in the color coding shown in FIG. 3, for example, the case is taken as an example in which for example, pixels of three row wise pixels times three column wise pixels are a unit pixel block and an addition process is done for two pixels in the same color (two row wise pixels times two column wise pixels) in the unit pixel block.

In this 2×2 pixel addition, the addition process is done each for odd numbered rows and even numbered rows. Thus, a pair of odd numbered rows and a pair of even numbered rows are alternately, repeatedly selected in such a way that the vertical drive part 12 performs vertical scanning to select the first row and the third row in a first single H period (H is a horizontal scanning period), to select the second row and the forth row in the subsequent single H period, to select the fifth row and the seventh row in the subsequent single H period, to select the sixth row and the eighth row in the subsequent single H period, and so on.

In addition, in FIGS. 6 and 7, for the sake of easy understanding, only shown and explained are pixels in the nth row, the (n+2)th row, mth column and the (m+2)th column, and the column signal processing circuit 13m in the mth column and the column signal processing circuit 13 (m+2) in the (m+2)th column.

Figure 8:
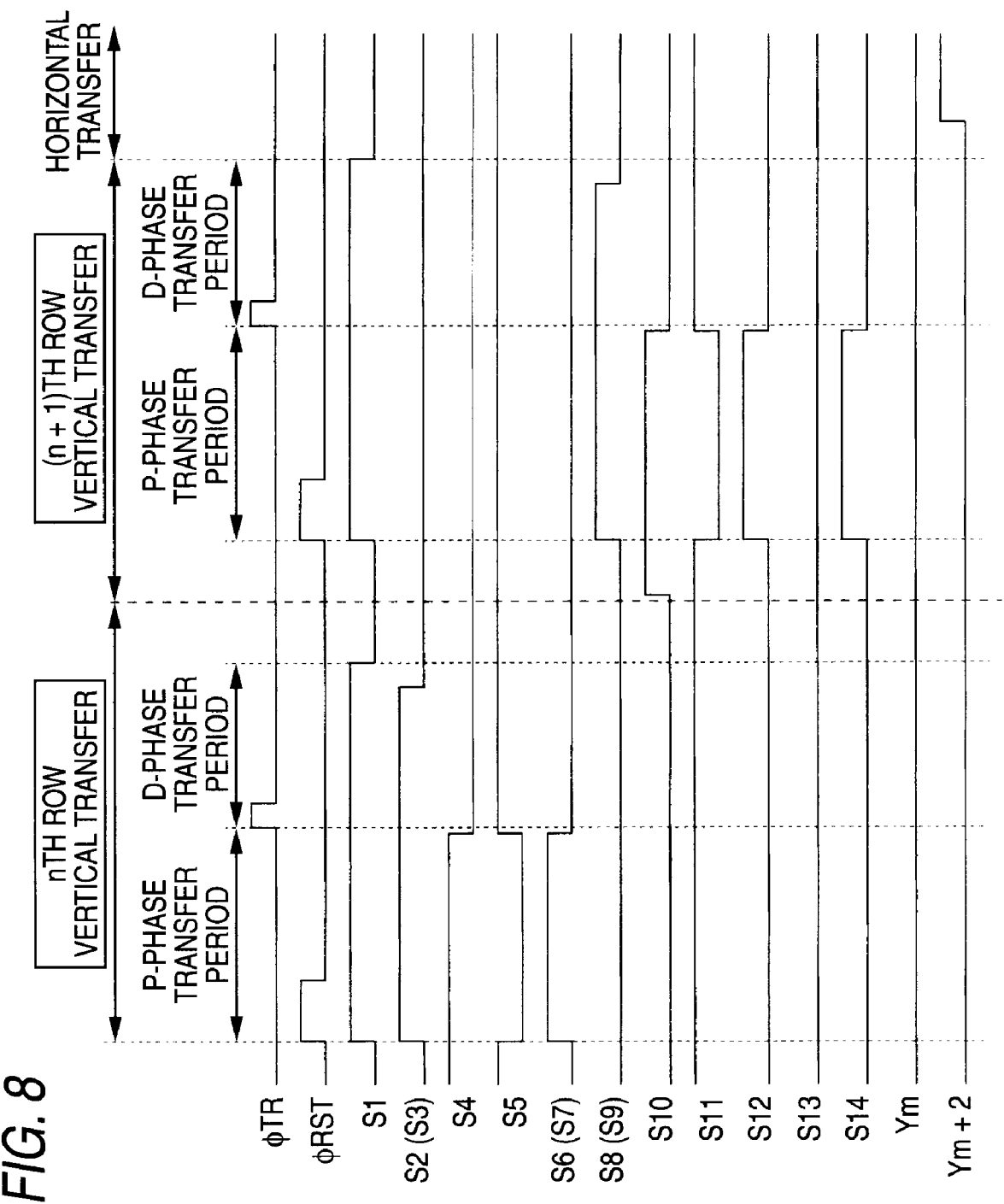
FIG. 8 is a timing chart illustrating the timing relationship to drive switches S1 to S14.

In performing pixel addition, the timing is important to switch the addition switches S1 and S14 and the control switches S2 to S13 between on and off. FIG. 8 shows the timing relationship for driving the switches S1 to S14. Timing signals to control switching the switches S1 to S14 on and off are created at the timing generator 17 shown in FIG. 1.

In a timing chart shown in FIG. 8, the transfer pulse φTR is a pulse signal which transfers the charge stored in the photodiode 21 to the FD part 26. By the transfer operation, a signal level (hereinafter, denoted as "D-phase level") Vd is read out of the pixel 20 to the vertical signal line 111. The period to read out the D-phase level Vd is a D-phase transfer period.

The reset pulse φRST is a pulse signal which resets the potential at the FD part 26 to the power supply potential VDD. By the reset operation, a reset level (hereinafter, denoted as "P-phase level") Vp at 0 level is read out of the pixel 20 to the vertical signal line 111. The period to read out the P-phase level Vp is a P-phase transfer period.

P-Phase Transfer Period in the nth Rows

Figure 6A:
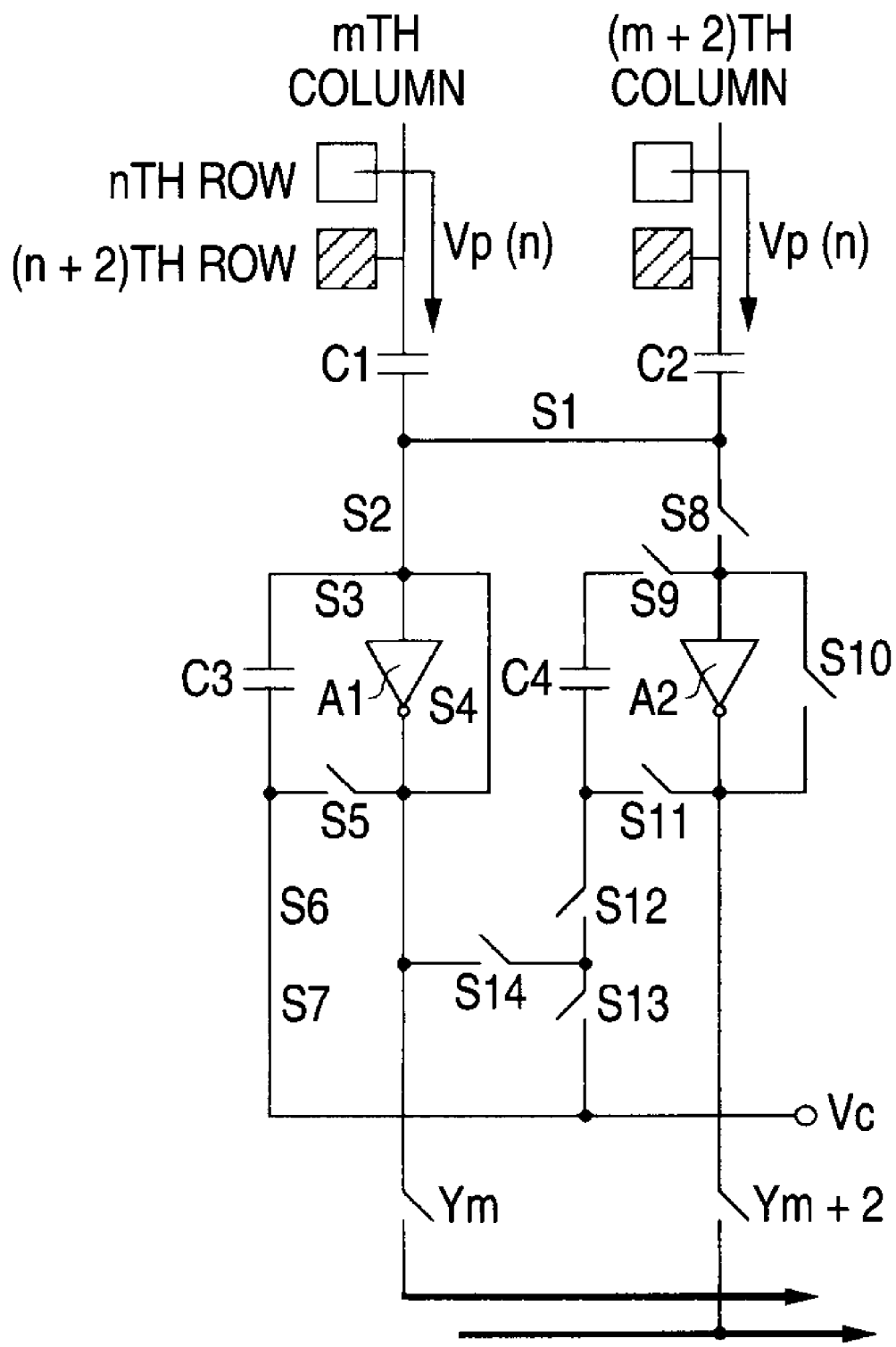
FIGS. 6A and 6B are illustrations for explanation of the circuit operation when 2×2 pixel addition (first one) is done.

First, as shown in FIG. 6A, the operation will be described when the P-phase level is read out of the pixels in the same color in the nth row. Signals are read out simultaneously from open pixels in the same color at the mth column and the (m+2)th column in the nth row, and at the same time, the addition switch S1 and the control switches S2 and S3 are turned to the ON state for row wise pixel addition.

At this time, since the control switch (feedback switch) S4 is in the ON state and feedback is on the reverse amplifier A1, the reverse amplifier A1 operates at a predetermined operation point. In addition, in synchronization with the addition switch S1, the control switch S5 is turned to the OFF state and the control switches S6 and S7 are turned to the ON state, and thus the reference voltage Vc is pre-charged to the feedback capacitance C3 of the line memory for analog clamping.

By a series of the operations, the CDS capacitances C1 and C2 are stored with the P-phase level including fluctuation information of a threshold Vth of each of the pixels. Here, the control switches S8 to S13 in the column signal processing circuit 13 (m+2) in the (m+2)th column are all in the OFF state. More specifically, when the row wise (lateral) addition in the nth row is performed, only the column signal processing circuit 13m in the mth column operates.

D-Phase Transfer Period in the nth Row

After the P-phase level readout is finished, the operation is moved to the D-phase level readout. The D-phase level is read out subsequent to the P-phase level, and then a CDS process is done in which the difference is taken between the P-phase level and the D-phase level at the CDS capacitances C1 and C2 to remove fixed pattern noise at each of the pixels.

Figure 6B:
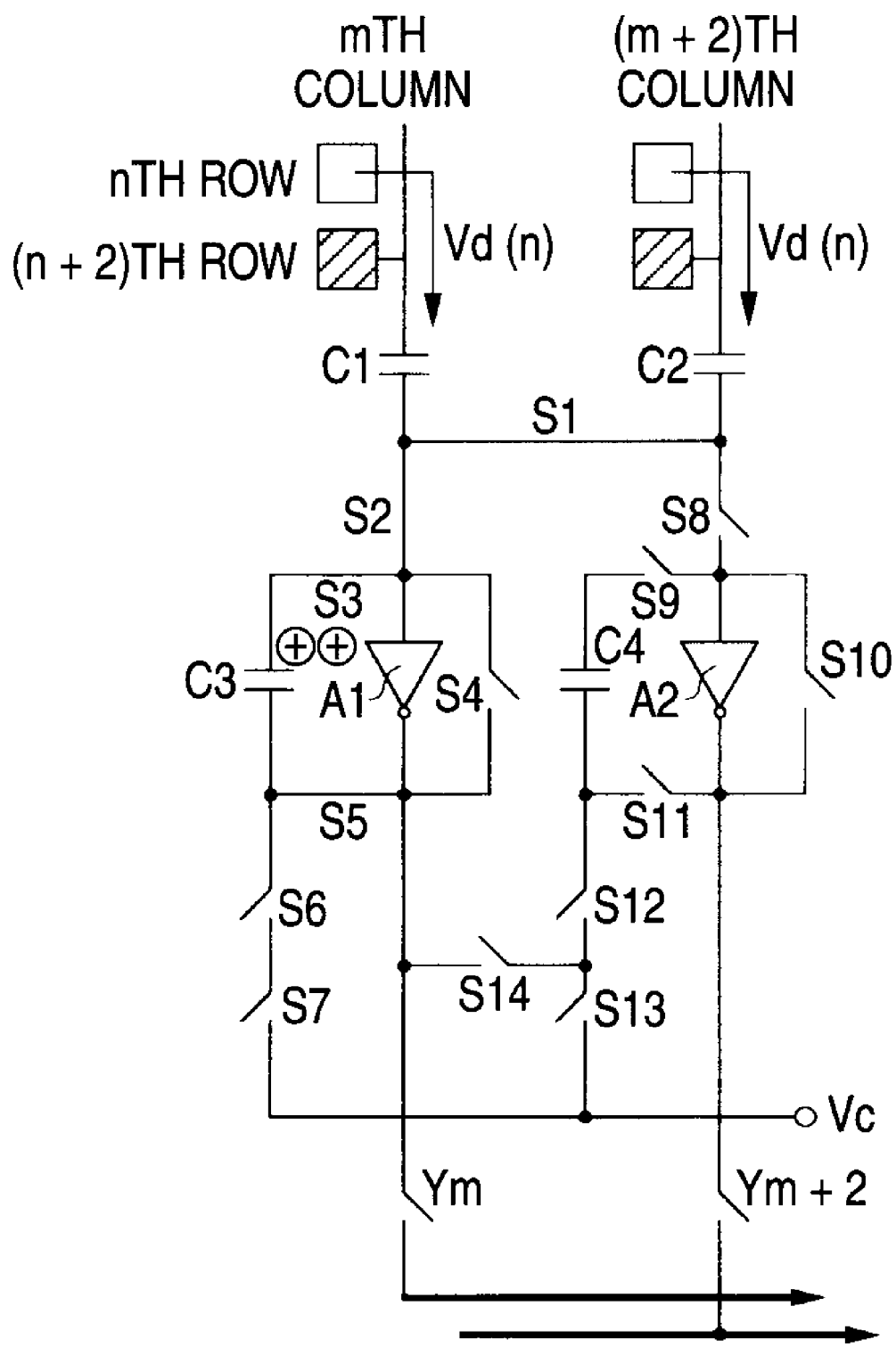

In addition, in the D-phase level readout, as shown in FIG. 6B, the control switch S4 is turned to the OFF state with the addition switch S1 and the control switches S2 and S3 remaining in the ON state as in the P-phase transfer period, and the control switch S5 is turned to the ON state. Thus, the feedback capacitance C3 is connected to the reverse amplifier A1 in parallel, and the pixel signals of open pixels after the CDS process in the mth column and the (m+2) th column are stored in the feedback capacitance C3. Consequently, the signals of two pixels in two columns are added at the feedback capacitance C3.

In order to form this series of the operations into an equation, suppose the P-phase level of two open pixels is Vp(n), and the D-phase level is Vd(n), and then the voltage resulted from the CDS process (subtraction process) in the D-phase transfer period in the nth row and from pixel addition, that is, the output voltage V1 of the reverse amplifier A1 is expressed by Equation (1) below:

$$V1 = A(Vp(n) - Vd(n)) + Vc \qquad (1)$$

Here, a constant A expresses the gain of the reverse amplifier A1, which is given by $A = (C1+C2)/C3$.

As apparent from the Equation (1), since the output voltage V1 of the reverse amplifier A1 is determined by the CDS capacitances C1 and C2 for two columns, the signal level is two times the signal level in the normal unit pixel readout. Then, the capacitance value of the feedback capacitance C3 is made variable to allow a configuration that can adjust a gain A of the reverse amplifier A1. For example, suppose the capacitance value of the feedback capacitance C3 is doubled, this can be done in which the amplification factor is set to the same value as that in the normal unit pixel readout and the signal level in pixel addition is equal to the signal level in unit pixel readout.

P-Phase/D-Phase Transfer Period in the (n+2)th Row

As for the readout in the (n+2)th row, the addition switch S1 and the control switches S8 and S9 are turned to the ON state, and then basically the same operation as that of the readout in the nth row is performed. The difference is in that these operations are added: the operation of using the column signal processing circuit 13 (m+2) in the (m+2)th column, and the operation of column wise (longitudinal) addition of the nth row with the (n+2)th row.

Figure 7A:
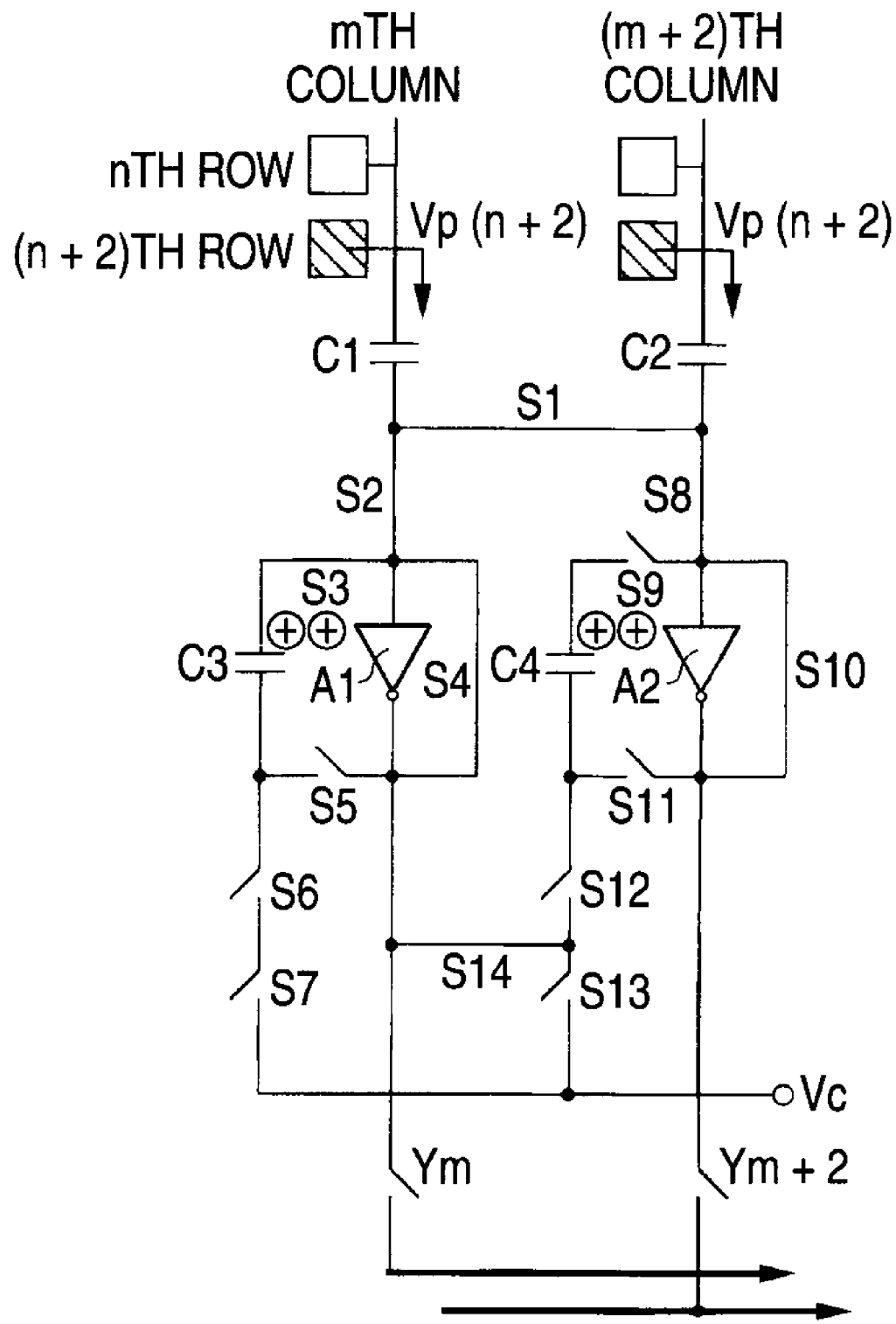
FIGS. 7a, 7B and 7C are illustrations for explanation of the circuit operation when 2×2 pixel addition (second one) is done.

In the readout of the P-phase level in the (n+2)th row, as shown in FIG. 7A, the control switch S11 is turned to the OFF state, and the control switch S12 and the addition switch S14 are turned to the ON state at the same time. Thus, the charge stored in the feedback capacitance C3 travels through the path from the control switch S5 to the addition switch S14 to the control switch S12, and then is pre-charged in the feedback capacitance C4.

More specifically, in the readout in the nth row, the reference voltage Vc is used for the precharge voltage of the line memory (feedback capacitance C3), whereas in the readout in the (n+2)th row, the output voltage V1 obtained by row wise pixel addition is used for the precharge voltage of the feedback capacitance C4. Therefore, as described below, column wise pixel addition can be implemented.

Figure 7B:
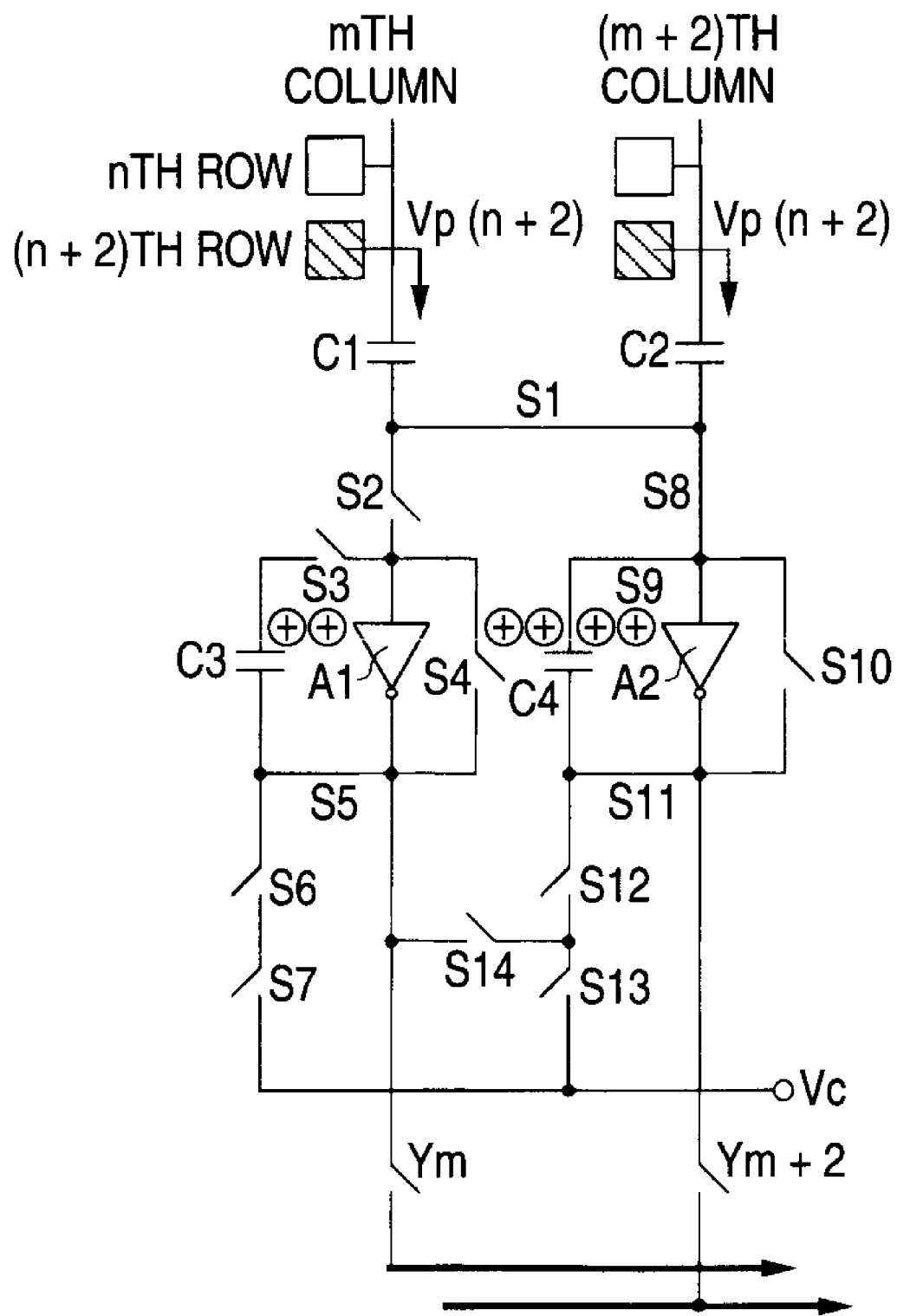

The P-phase level readout is done for dashed pixels in the same color at the mth column and the (m+2)th column in the (n+2)th row in the state in which the output voltage V1 is used for the precharge voltage of the feedback capacitance C4. After that, as shown in FIG. 7B, with the addition switch S1 and the control switches S8 and S9 remaining in the ON state, the control switch S10 and the addition switch S14 are turned to the OFF state, and the control switch S11 is turned to the ON state to read out the D-phase level.

Figure 7C:
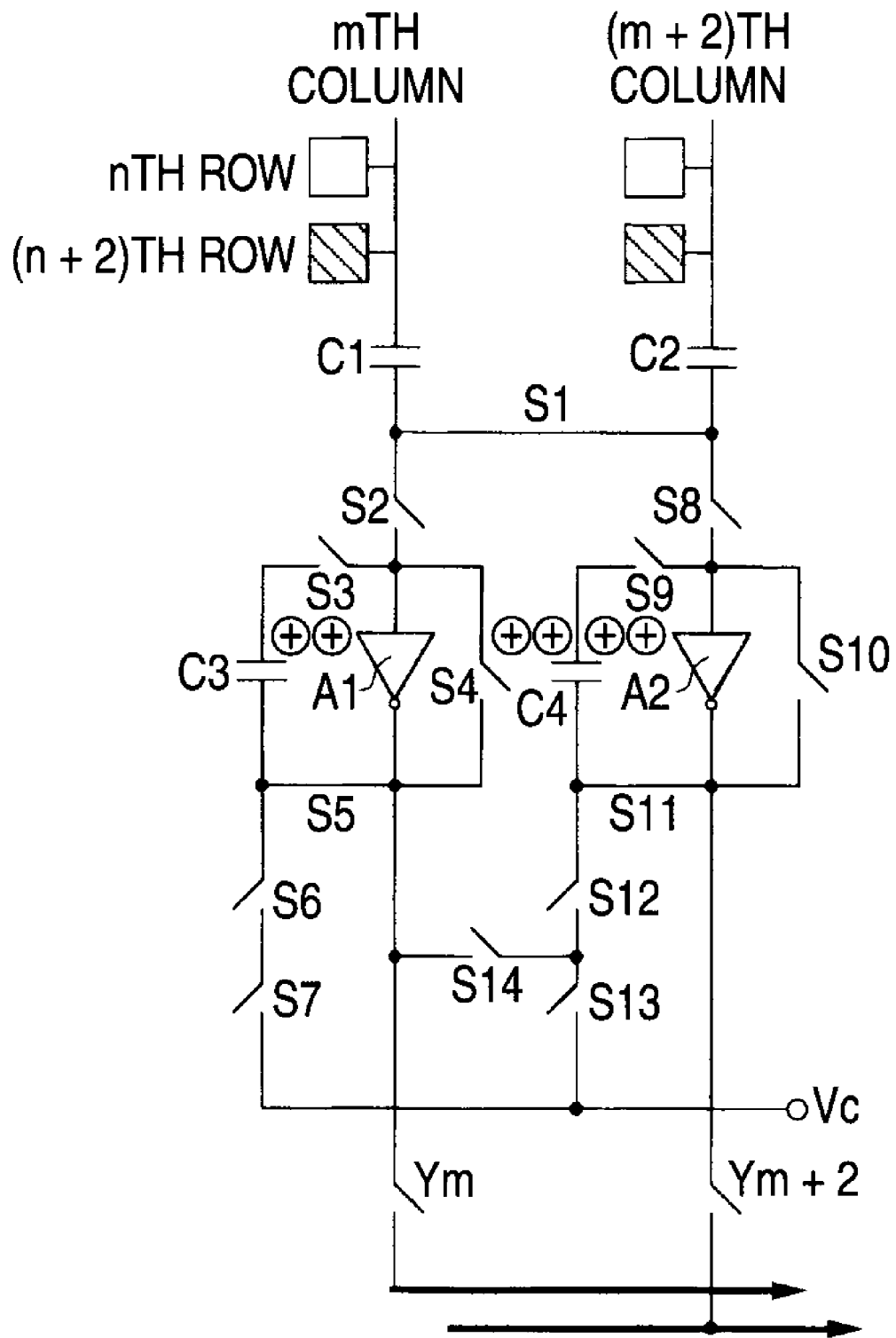

Thus, the signals of two open pixels at the mth column and the (m+2)th column in the nth row are added, and the signals of two dashed pixels at the mth column and the (m+2)th column in the (n+2)th row are further stored in the feedback capacitance C4 in which the column wise addition signal is pre-charged. Consequently, at the feedback capacitance C4, the signals of four pixels for two rows and two columns are added. After that, as shown in FIG. 7C, the addition switch S1 and the control switches S8 and S9 are turned to the OFF state to complete the operation of pixel signal readout in the nth row and the (n+2)th row and the operation of two times two pixel addition.

At this time, the output voltage V2 of the reverse amplifier A2 at the (m+2)th column is the voltage in which voltages at the nth row and the (n+2)th row are added in the column wise (longitudinal) direction as expressed by Equation (2) below, where the P-phase of two dashed pixels is Vp(n+2), and the D-phase level is Vd(n+2):

$$V2 = A(Vp(n) - Vd(n)) + A(Vp(n+2) - Vd(n+2)) + Vc \quad (2)$$

Lastly, in synchronization with horizontal scanning by the horizontal scanning circuit 143, the horizontal selection switch Y (m+2) at the (m+2)th column is turned to the ON state, and the output voltage V2 is outputted through the horizontal signal line 141 (141-2), the analog amplifier 15 and the A/D converter 16. Therefore, in the color coding shown in FIG. 3, for example, pixels of three row wise pixels times three column wise pixels are a unit pixel block, and the signals of two pixels in the same color in the unit pixel block are added to take out as the pixel signals for a single pixel in simulation.

In summarizing the series of the operations for explanation, in the X-Y addressing solid state imaging device 10 provided with the color filter having a predetermined color coding at each of the pixels 20 and the column signal processing circuit part 13 disposed in each of the vertical signal lines 11, the following operation is done in which a plurality of pixels in the same color in the row wise and column wise directions is a unit pixel block, in reading the signals of the pixels in the same color in this unit pixel block in a single row n, the signals of the pixels in the same color are stored in the first feedback capacitance C3 at a single column m in the unit pixel block in the column signal processing circuit part 13, then in reading the signals of the pixels in the same color in a row (n+2) different from that single row n in the unit pixel block, the signals stored in the first feedback capacitance C3 are pre-charged in the second feedback capacitance C4 at a column (m+2) different from the single column m in the column signal processing circuit part 13, the signals of the pixels in the same color at the different row (n+2) are stored in the second feedback capacitance C4 after pre-charged, and the signals stored in the second feedback capacitance C4 are selectively outputted to the horizontal signal line 141.

In addition, in the series of the operations described above, the pixel addition of two row wise pixels times two column wise pixels are taken as an example and explained, but the operations are not limited thereto. Also in pixel additions such as three row wise pixels times three column wise pixels, the four row wise pixels times four column wise pixels, and so on, the basic operation may be repeatedly run.

As described above, each of the signal processing circuits of the column signal processing circuit part 13, the circuit being disposed at every column, is provided with the reverse amplifiers A1 and A2 which output the signals of the pixel 20 transmitted by the vertical signal line 111 at low impedance and with the feedback capacitances C3 and C4 which are properly connected in parallel to these the reverse amplifiers, and the feedback capacitances C3 and C4 are used to do the row wise and column wise pixel addition of the pixels in the same color in the unit pixel block to take out signals as the pixel signals for a single pixel in simulation. Thus, while the pixel area is increased in simulation, and the MTF (Modulation Transfer Function) value in the spatial frequency area equal to or greater than the Nyquist frequency decided by a pixel pitch is reduced, pixel information can be thinned out with both the order and the spatial position relationship of pixel information remaining the same as those in normal imaging (in reading all pixels).

Particularly, the feedback capacitances C3 and C4 of the reverse amplifiers A1 and A2 are used to do pixel addition in each of the signal processing circuits of the column signal processing circuit part 13 having the reverse amplifiers (analog amplifiers) A1 and A2, and thus the addition process can be done while the signals of the pixels are increased. Therefore, a pixel addition signal excellent in the signal-to-noise ratio can be obtained. In addition to this, since what to do is to simply add the signals of the pixels in the same color, in the example of 2×2 pixel addition, the signal level after added can be increased fourfold. Thus, there is also an advantage to increase the sensitivity.

In addition, since the gain fluctuations of signals caused in performing pixel addition can be absorbed by the gain control of the reverse amplifiers A1 and A2, the output voltage in the normal all pixel readout and in the pixel addition readout can be maintained constant. Therefore, also in the switching the operation between all pixel readout and pixel addition readout, signal processing can be done without changing a signal process system in the subsequent stage.

In addition, in the embodiment, the example is taken and explained that pixels of three row wise pixels times three column wise pixels are a unit pixel block, but it is not limited to this unit pixel block configuration. More specifically, when expressed by a general equation, a pixel block of (2k+3) row wise pixels×(2k+3) column wise pixels (k is an integer of 0 or greater) is a unit pixel block, and pixel information in the same color in the unit pixel block is all added. Thus, while the pixel area is increased in simulation, and the MTF value in the spatial frequency area equal to or greater than the Nyquist frequency decided by a pixel pitch is reduced, pixel information can be thinned out with both the order and the spatial position relationship of pixel information remaining the same as those in normal imaging.

Application

The solid state imaging device 10 according to the embodiment described above is preferably for use as an imaging device in an image pickup apparatus including a low power consumption camera part intended for mobile appliances such as a cellular mobile phone, and a high speed electronic still camera.

Figure 9:
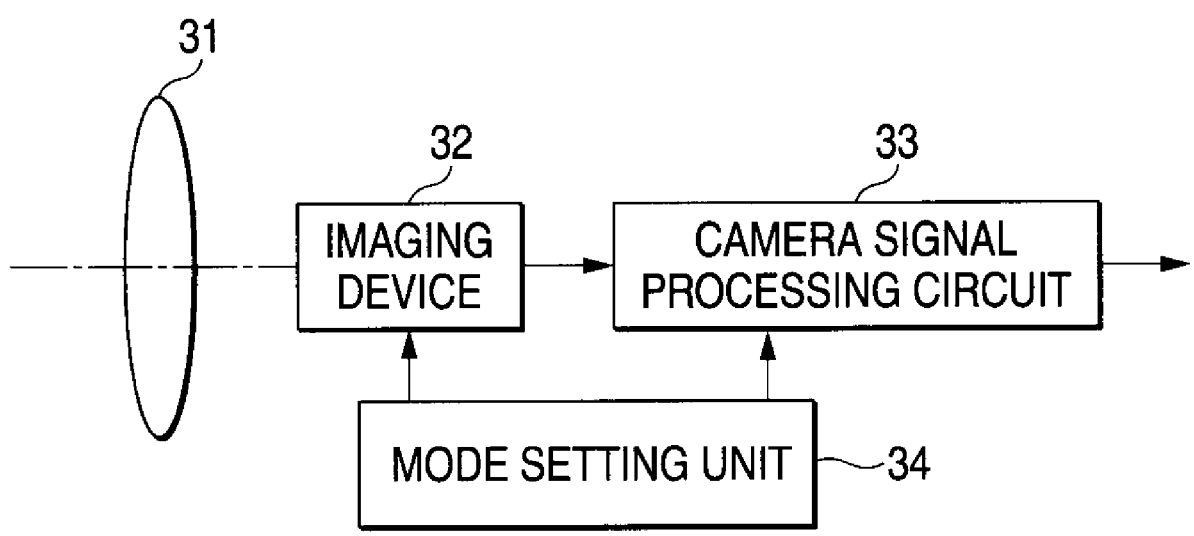
FIG. 9 is a block diagram illustrating an exemplary configuration of an image pickup apparatus according to an embodiment of the invention.

FIG. 9 is a block diagram illustrating an exemplary configuration of an image pickup apparatus according to an embodiment of the invention. As shown in FIG. 9, the image pickup apparatus of this embodiment is configured to have a lens 31, an imaging device 32, a camera signal processing circuit 33, a mode setting unit 34, etc.

The lens 31 forms the light of an image from a subject on the imaging surface of the imaging device 32. The imaging device 32 outputs picture signals obtained by converting the light of the image formed on the imaging surface by the lens 31 to electric signals in units of pixels. For the imaging device 32, the solid state imaging device 10 according to the embodiment described above is used.

The camera signal processing circuit part 33 performs various signal processes for the picture signals outputted from the imaging device 32. The mode setting unit 34 selectively sets operation modes for the imaging device 32: an all pixel readout mode in which the signals of all the pixels are read out separately, and a pixel addition readout mode in which pixel addition is done in accordance with user's specification. Generally, the all pixel readout mode is set in an imaging mode to display a still picture, and the pixel addition readout mode is set in a monitoring mode to display a moving picture.

The solid state imaging device 10 used for the imaging device 32 performs the operation of separately reading the signals of all the pixels described above when the all pixel readout mode is set, whereas when the pixel addition readout mode is set, it performs the series of the operations described above, that is, the operations in which the row wise and column wise pixel addition is done for the pixels in the same color in a unit pixel block to read the pixel signals for a single pixel in simulation.

As described above, the solid state imaging device 10 according to the embodiment above is used as the imaging device 32 in the image pickup apparatus including a camera part intended for mobile appliances such as a cellular mobile phone and a high speed electronic still camera, and thus an image excellent in quality can be obtained because the solid state imaging device 10 can take out pixel addition signals excellent in the signal-to-noise ratio.

In addition, the gain fluctuations of the signals caused in performing pixel addition are absorbed by gain control of the reverse amplifiers A1 and A2, and the output voltage in the all pixel readout and in the pixel addition readout can be maintained constant. Therefore, there is an advantage to do signal processing also in the switching operation between the all pixel readout and the pixel addition readout without changing the camera signal processing circuit 33.

It should be understood by those skilled in the art that various modifications, combinations, sub-combinations and alternations may occur depending on design requirements and other factors insofar as they are within the scope of the appended claims or the equivalents thereof.

What is claimed is:

1. A solid state imaging device comprising:
a pixel array part which has a plurality of pixels which are arranged two-dimensionally and each of which includes a photoelectric conversion element, a plurality of vertical signal lines which transmit a signal from each of the plurality of pixels and a color filter which has a predetermined color coding at the plurality of pixels;
a column signal processing circuit part which has a plurality of analog amplifiers which receive the signal from each of the plurality of pixels transmitted through the plurality of vertical signal lines and a plurality of feedback capacitances which are adjustably connected in parallel to the plurality of analog amplifiers;
a first control part which performs control in which a certain number of pixels in the same color in row wise and column wise directions is a unit pixel block, and in reading signals of the pixels in the same color in a single row in the unit pixel block, the signals of the pixels in the same color are stored in a first feedback capacitance of a single column in the column signal processing circuit part;
a second control part which performs control in which in reading signals of the pixels in the same color at a row different from the single row in the unit pixel block, the signals stored in the first feedback capacitance are pre-charged in a second feedback capacitance at a column different from the single column in the column signal processing circuit part; and
a third control part which performs control in which the signals of the pixels in the same color at the different row are stored in the second feedback capacitance after pre-charged.

2. The solid state imaging device according to claim 1, wherein
the plurality of analog amplifiers have an amplification factor variable by adjusting a capacitance value of the first and the second feedback capacitances.

3. A method of driving a solid state imaging device having a pixel array part which has a plurality of pixels which are arranged two-dimensionally and each of which includes a photoelectric conversion element, a plurality of vertical signal lines which transmit a signal from each of the plurality of pixels, and a color filter which has a predetermined color coding at the plurality of pixels, and
a column signal processing circuit part which has a plurality of analog amplifiers that receive the signal from each of the plurality of pixels transmitted through the plurality of vertical signal lines and a plurality of feedback capacitances that are adjustably connected in parallel to the plurality of analog amplifiers, the method comprising:
a first step wherein a certain number of pixels in the same color in row wise and column wise directions is a unit pixel block, and in reading signals of the pixels in the same color in a single row in the unit pixel block, the signals of the pixels in the same color are stored in a first feedback capacitance of a single column in the column signal processing circuit part;
a second step wherein in reading signals of the pixels in the same color at a row different from the single row in the unit pixel block, the signals stored in the first feedback capacitance are pre-charged in a second feedback capacitance at a column different from the single column in the column signal processing circuit part; and
a third step wherein the signals of the pixels in the same color at the different row are stored in the second feedback capacitance after pre-charged.

4. An image pickup apparatus comprising:
a solid state imaging device having a pixel array part which has a plurality of pixels which are arranged two-dimensionally and each of which includes a photoelectric conversion element, a plurality of vertical signal lines which transmit a signal of the pixel and a color filter which has a predetermined color coding at each of the pixels, and a column signal processing circuit part which has a plurality of analog amplifiers that outputs a signal of the pixel transmitted through the vertical signal line at low impedance, and a plurality of feedback capacitances that are adjustably connected in parallel to the plurality of analog amplifiers;
an optical system which forms a light of an image from a subject on an imaging surface of the solid state imaging device; and
a mode setting portion which selectively sets operation modes for the solid state imaging device, an all pixel readout mode which reads signals of all the plurality of pixels of the solid state imaging device, and a pixel addition readout mode which adds signals of the plurality of pixels for readout,
wherein the solid state imaging device has
a first control part which performs control in which a certain number of pixels in the same color in row wise and column wise directions is a unit pixel block, and in reading signals of the pixels in the same color in a single row in the unit pixel block, the signals of the pixels in the same color are stored in a first feedback capacitance of a single column in the column signal processing circuit part;

a second control part which performs control in which in reading signals of the pixels in the same color at a row different from that single row in the unit pixel block, the signals stored in the first feedback capacitance are pre-charged in a second feedback capacitance at a column different from the single column in the column signal processing circuit part; and a third control part which performs control in which the signals of the pixels in the same color at the different row are stored in the second feedback capacitance after pre-charged; and wherein when the pixel addition readout mode is set by the mode setting part, control by the first control part and the second control part is performed.

* * * * *